Sept. 29, 1953

A. ANDREWS 2,653,458

CENTRIFUGAL CONTROL MECHANISM

Filed Dec. 26, 1947

INVENTOR.
Albert Andrews
BY
Lamphere and Van Valkenburgh
ATTORNEYS

Sept. 29, 1953     A. ANDREWS     2,653,458
CENTRIFUGAL CONTROL MECHANISM

Filed Dec. 26, 1947     2 Sheets-Sheet 2

*INVENTOR.*
Albert Andrews
BY
*ATTORNEYS*

Patented Sept. 29, 1953

2,653,458

UNITED STATES PATENT OFFICE 2,653,458

CENTRIFUGAL CONTROL MECHANISM

Albert Andrews, Fort Collins, Colo.

Application December 26, 1947, Serial No. 793,914

3 Claims. (Cl. 64—25)

This invention relates to centrifugal control mechanism for gearing and the like, as for driving cam shafts and other timing devices. Such mechanism is primarily adapted for use in internal combustion engines, as of the four-cycle "gas" type, i. e. utilizing the Otto or Beau de Rochas cycle, as well as of the fuel injection type, i. e. utilizing the diesel cycle. This invention relates to the subject matter of my U. S. Patent No. 2,225,383, granted December 17, 1940, and entitled "Centrifugal Engine Governing Mechanism."

In internal combustion engines, particularly of the four-cycle "gas" type, the flow of the combustible mixture to the various cylinders is designed primarily for a particular speed or short range of speeds, normally a fairly low speed. At relatively high speeds and/or heavy loads, and particularly when acceleration is coupled with a relatively heavy increase in load, as indicated by reduction in manifold suction pressure, the flow of the combustible mixture is normally retarded to such an extent that a full cylinder of the mixture is not received by the time the intake valve closes. Also, at higher speeds the shorter length in time of the stroke requires that the spark be advanced so that ignition will occur earlier and sufficiently complete combustion will take place to insure maximum power output. Since an advance in the opening of the intake valves and an advance in the spark are both desirable, and at substantially the same time, i. e. upon acceleration as well as upon increased speed, control of such advance can be effected by a single mechanism.

An additional factor tending to reduce power is wear on parts such as cams, whereby the time of opening of the valves lags behind that produced by unworn cams. Such lag in the intake valve opening tends to reduce the amount of combustible mixture received by each cylinder, and lag in the exhaust valve opening tends to produce undue pressure at the end of the power stroke as well as tending to leave exhaust gases in the cylinder which tend to reduce the amount of available oxygen in the next combustible mixture charge.

A somewhat similar problem is encountered in engines operating on the diesel cycle, either two-cycle or four-cycle, wherein the combustible mixture is not formed until the fuel is injected into the cylinder, containing air compressed during the compression stroke. Particularly when acceleration under a heavy load is desired, the amount of fuel injected, as well as the time of injection, tends to lag behind that required for an approach to the desired power output during such acceleration. This occurs when the amount of fuel injected is controlled by a piston pump, as well as by a lever, slide or other device operating similarly to a valve, the time of injection usually being controlled by a cam shaft or the like. A steam shovel powered by an engine operating on the Beau de Rochas cycle, for instance, is subject to the disadvantage that maximum power normally cannot be obtained on acceleration, but the same difficulty normally occurs to a considerably greater extent in the case of engines operating on the diesel cycle. For instance, when the shovel of a steam shovel is full, or a drag line bucket has engaged the desired amount of earth or other material to be moved, the operator of the shovel or drag line cannot accelerate a "gas" engine (operating on the Beau de Rochas cycle) as much as desired, and must be particularly careful in attempting to accelerate a diesel engine, which tends to stall. Thus, considerable time is lost in accelerating the load, after it has been engaged or is being picked up by the shovel or drag line bucket, thereby reducing considerably the total amount of material which may be moved by the shovel or drag line in a given period of time.

Among the objects of this invention are to provide an improved centrifugal mechanism for use in controlling the timing and/or valve opening and the like of an internal combustion engine; to provide such mechanism which is operative to advance the speed of a cam shaft, ignition timing and/or fuel injection device, so as to compensate for changes in engine speed, or for wear of parts such as cams; to provide such a mechanism which operates effectively in closed position without back lash or the like; to provide various forms of such mechanism, each of which has certain advantages; to provide such mechanism, or forms thereof, wherein the mechanism becomes operative at a predetermined speed; to provide such mechanism wherein the amount of advance may be limited, and to provide forms wherein such amount of advance may be adjusted; to provide such mechanism which may be incorporated with the usual timing drive gear or similar rotating drives of existing engines; and to provide such mechanism which is relatively simple in construction, yet reliable and effective in operation.

Other objects and the advantages of this invention will be apparent from the following description, taken with reference to the accompanying drawings, in which.

Figure 1:
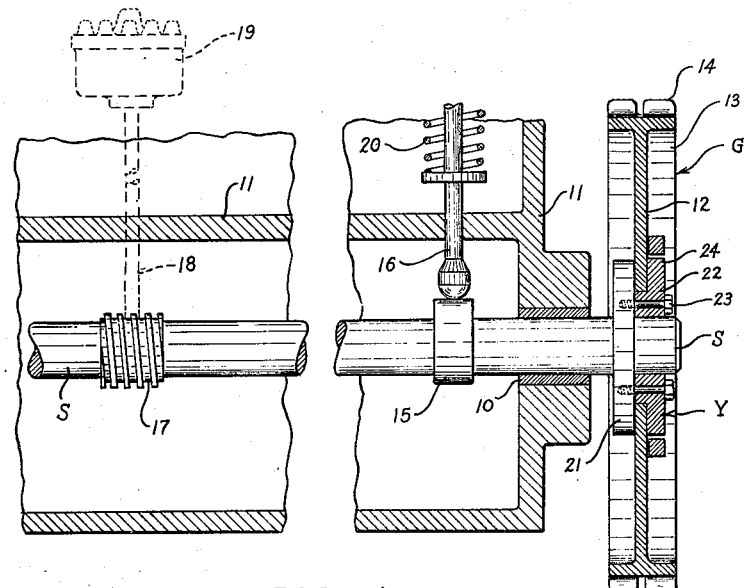
Fig. 1 is a longitudinal section through a portion of an engine block, in which the cam shaft drive gear is provided with centrifugal control mechanism constructed in accordance with this invention.

As shown in Fig. 1 of the drawings, the centrifugal control device of this invention may be applied to a rotating drive element such as a substantially conventional timing gear G, and adapted to rotate a timing shaft S, which is mounted in bearings 10 within an engine block 11. The timing gear G has a web 12 and includes a rim 13 having teeth 14, the latter being engaged by a chain, or by a pinion, normally driven off the engine crankshaft. The timing shaft S, as illustrated, is a cam shaft provided with a plurality of cams 15, each cam actuating a corresponding push rod 16, which is moved upwardly by the cam against the compression of a spring 20, and moved downwardly by the spring, to open and close the valves controlling the intake of the combustible mixture to the various cylinders of the engine, or the exhaust of the gases from the cylinders thereof. The cam shaft may also be provided with a conventional worm 17 or other suitable drive means for rotating the shaft 18 of a timer or distributor 19, as through a worm gear rotated by worm 17. The engine block, valve push rods and distributor drive are, in general, conventional, and may vary from engine to engine from the construction illustrated.

The rotating drive element or timing gear G is normally keyed or otherwise secured to shaft S, as by being bolted to a shoulder 21 formed integrally with or secured to the shaft. In the construction exemplifying the present invention, the centrifugal control mechanism is provided in means for connecting the rotating drive element with the shaft, which includes a yoke Y provided with a central ring 22 attached by cap screws 23 to the shoulder 21, although a key or other means of attachment may be used. When the gear G is attached directly to the shaft, the cap screws 23 may extend through web 12 of the gear G, but for the present invention, the opening in the web, which normally surrounds the shaft S, is enlarged to accommodate yoke Y, the web 12 of the gear G thereby being rotatable in the space between shoulder 21 and a flange 24 of yoke Y, as in Fig. 1. The yoke Y is also provided with two oppositely disposed, radially extending arms 25, adapted to be engaged by the rear or cam portions 26 of centrifugal arms C, each of which is pivoted adjacent the rear end on a suitable pivot, such as a pin or bolt 27, shown also in Figs. 3 and 4. When the speed of the engine increases, the gear G rotating in the direction of the arrow 28 of Fig. 2, the centrifugal arms C will move outwardly, about pivot bolts 27, and the yoke Y will be moved ahead, i. e. advanced, with respect to the gear G, thus producing a corresponding advance in the relative position between the shaft S and the gear G.

Figure 2:
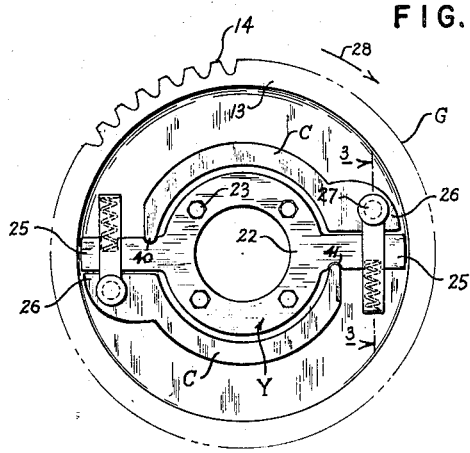
Fig. 2 is an end view of the cam shaft drive gear, provided with the control mechanism of this invention.
Figure 3:
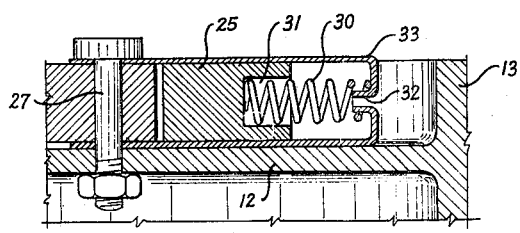
Fig. 3 is a partial cross section taken along line 3—3 of Fig. 2.
Figure 4:
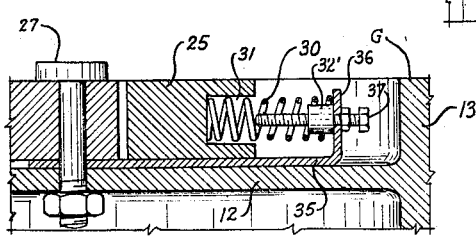
Fig. 4 is a cross section similar to that of Fig. 3, but illustrating a modification of the mechanism thereof.

For practical operation, it is desirable that the centrifugal arms C will become operative only when a predetermined speed of rotation is reached, and for this purpose resilient means, such as springs 30 of Figs. 2 to 4, inclusive, may be utilized to resist the relative movement or advance of the yoke Y, and, of course, the shaft S attached thereto. As in Figs. 2 and 3, the springs 30 are compression springs, and may be received at one end in a well 31, formed in an arm 25 of yoke Y, the opposite end of the spring encircling an inwardly extending projection 32 formed at the outer end of a restraining loop 33. The lateral ends of loop 33 may be provided with holes, so that bolt 27 will pass therethrough, in order to anchor the end of the loop 33. As will be evident, the loop 33 is, in effect, connected to the web 12 of gear G, and does not affect the movement of the centrifugal arms C, except in so far as the springs offer resistance to movement of the yoke. If desired, a bracket 35, as in Fig. 4, may be utilized in lieu of loop 33, bracket 35 being connected at one end to bolt 27, and at its opposite end provided with a flange 36, in turn provided with an inwardly extending projection 32', for retaining and positioning the outer end of spring 30. In addition, the interior of projection 32' may be threaded, to accommodate a stop screw 37, which provides an adjustable limitation on the relative movement or advance of the yoke arm. Thus, as in Fig. 4, the yoke Y can move relatively or advance only until the bottom of well 31 engages the end of stop screw 37. If desired, the projection 32, of loop 33 of Fig. 3, may be similarly threaded and provided with a stop screw 37.

While resilient restraining means, such as springs 30, operates satisfactorily to prevent advance or relative movement of yoke Y and shaft S until a predetermined speed in reached, there may be a tendency for back lash or vibration between the yoke Y and the centrifugal arms C, particularly during deceleration at speeds below that at which the centrifugal arms C will move outwardly, i. e. when centrifugal arms C are in a "neutral" position. To obviate this, each centrifugal arm C is preferably semi-circular so as to extend around the yoke ring 22 to the opposite yoke arm 25, and inter-engaging means are provided, such as a rounded end 40 on each centrifugal arm C, and an arcuate groove 41 in the yoke arm 25, each groove 41 being adapted to receive the corresponding centrifugal arm end 40. While the form or shape of the end 40 of each centrifugal arm C and the groove 41 in yoke arm 25 may vary from that shown, the shape is preferably such that the ends of the centrifugal arms can move from neutral position, only directly outwardly from the yoke arms, and therefore will be locked in a neutral position until the predetermined speed is exceeded. Thus, any back thrust from shaft S transmitted to the yoke from the centrifugal arms will not cause the arms to move outwardly. An arcuate slot forms an effective lock, due to the greater radius of the ends 40 of centrifugal arms C from the pivot points at bolts 27, when there is any tendency for the yoke arms 25 to turn and move the centrifugal arms C outwardly, there will be a slight sliding movement of the ends of the centrifugal arms along the surface of the yoke arms 25, but such sliding movement is prevented by the engagement between ends 40 and grooves 41. However, when the centrifugal arms C tend to move outwardly by centrifugal force, the ends 40 and grooves 41 do not interfere in any manner with such movement, since the arms will begin to move outwardly to clear the grooves, before the cam portions 26 begin to turn the yoke arms 25.

Figure 5:
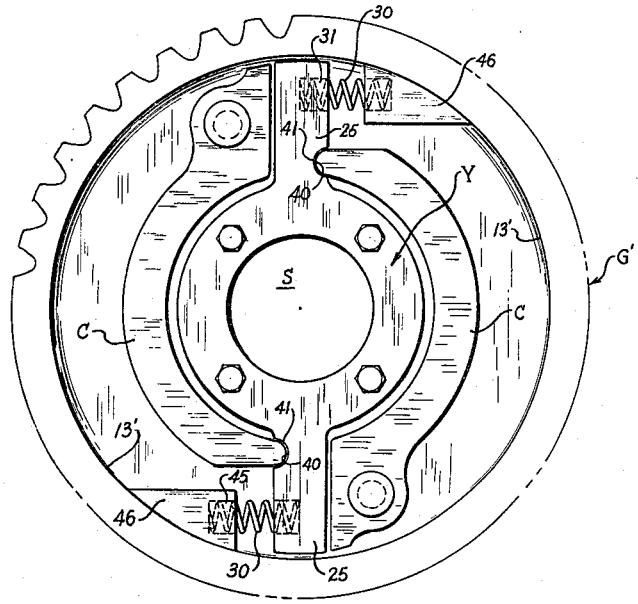
Fig. 5 is an end view of a timing gear provided with another embodiment of the centrifgugal control mechanism of this invention.

In the alternative embodiment illustrated in Fig. 5, the yoke Y and centrifugal arms C are similar in construction to those of Figs. 1–4, but the outer end of each spring 30 extends into a well 45 formed in a boss 46. Each boss 46 may be formed integrally, or made separately and attached, as by welding or the like, to the inside of rim 13' of gear G'. As in the first embodiment, the centrifugal arms C are provided with rounded ends 40 and adapted to engage locking grooves 41 in yoke arms 25, when in inactive or neutral position, that is, when the speed of the engine is at or below a predetermined value. Also, as before, the springs 30 will prevent a relative radial movement of yoke Y until the predetermined speed is reached, whereupon the centrifugal arms, through cam portions 26 acting against yoke arms 25, will cause the yoke and shaft S attached thereto, to move relatively or advance, the amount of the advance being proportional to the speed, as determined by the position of the centrifugal arms C.

Figure 6:
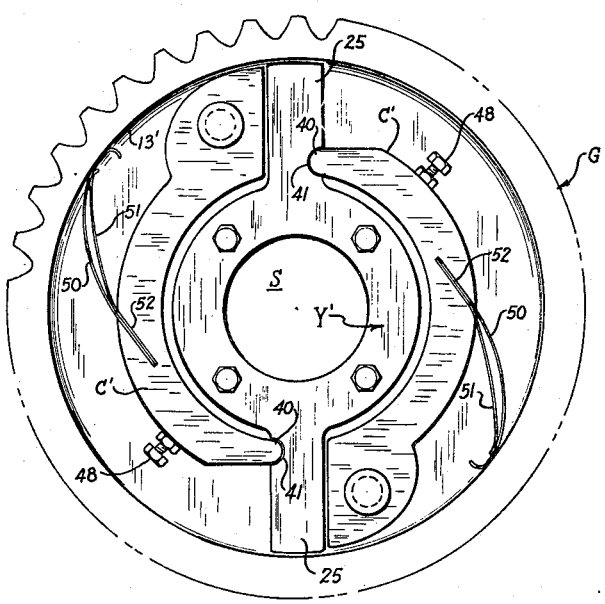
Fig. 6 is a similar end view of a timing gear, provided with a centrifugal control mechanism forming a still further embodiment of this invention.

In the additional alternative embodiment illustrated in Fig. 6, the resilient means comprises one or more leaf springs 50 and 51, received in slots 52 extending into centrifugal arms C'. Spring 50 bears at its outer end against the inside of rim 13 of gear G, and is adapted to resist movement of centrifugal arms C' initially, while after initial outward movement, leaf spring 51 comes into play, to increase the resistance to movement. Such action tends to stabilize the centrifugal arms in position, and also to increase the sensitivity for initial movement. More than two leaf springs may, of course, be utilized, and another advantage of such construction is that the leaf springs are easier to install than the coil springs of the previous embodiments. As in the previous embodiments, the yoke arms 25 are provided with grooves 41 for engagement with the rounded ends 40 of centrifugal arms C'. In addition, the arms C' may be provided with stop bolts 48, each having a lock nut, as shown, so as to be adjustable in position, in order to limit the outward movement and the resultant advance of the timing to a predetermined value, which will, of course, correspond to a predetermined engine speed.

From the foregoing, it will be apparent that the centrifugal mechanism of this invention fulfills to a marked degree the requirements and objects hereinbefore set forth. As will be evident, the use of resilient restraining means, for restraining outward movement of the centrifugal arms, and also for preventing outward movement of the centrifugal arms below a predetermined speed, provides several valuable features. Such restraining means preferably increase in resistance to the relative movement between the drive element and the shaft, as the centrifugal arms move outwardly. Compression springs, of course, increase in resistance as they are compressed, while a series of leaf springs, each shorter than the preceding spring, also act to increase the resistance. In addition, such leaf springs tend to cause the arms to be maintained at predetermined points, thereby reducing the tendency for "hunting." Such restraining means, when active against the arms of a yoke, permit the centrifugal arms to move upwardly relatively freely, thus producing greater sensitivity at initial movement, but also must be overcome for the arms to move the yoke. However, when the springs are leaf springs, acting between the centrifugal arms and the rim of the gear, they are preferably so graduated that the resistance offered to initial movement is a minimum. This also increases sensitivity at neutral position. The inter-engaging means formed between the centrifugal arms and the yoke arms, for locking the same in neutral position, with respect to back lash from the timing shaft, is also valuable in that normal movement of the centrifugal arms is not interfered with. Such inter-engaging means, when utilized with centrifugal arms having a cam section adapted to engage a yoke arm, provide a much simpler construction than if the centrifugal arms were provided with gear teeth for engaging a pinion or the like. Also, the embodiments of Figs. 1 to 4 and Fig. 6 of this invention are particularly adapted to utilize the usual conventional timing gear without substantial change therein, except drilling and tapping holes to accommodate the pivot bolts for the centrifugal arms, and enlarging the central aperture in the gear web to accommodate the yoke. This is an advantage over a construction in which gear teeth are formed on the inside of the rim, which requires a special gear. Also, in the embodiment of Fig. 5, where the spring bosses are added to the gear rim, it is unnecessary to make an entirely new gear, as the bosses may be attached to the inside of the rim of a standard gear, and need not be as accurately placed or machined as gear teeth.

Although the centrifugal control mechanism of this invention has been illustrated and described in connection with the cam shaft of an internal combustion engine operating on the Beau de Rochas cycle, it will be understood that the shaft S exemplifies all types of rotating shafts or elements to which the invention may be applied. Thus, the shaft S may be the cam shaft of a diesel engine, or a shaft for controlling the injection of fuel, a shaft actuating a fuel pump or the like, and other types of shafts or rotating elements. Although several embodiments of this invention have been described, it will be understood that other embodiments may exist, and that various changes may be made in the various embodiments, all without departing from the spirit and scope of this invention.

What is claimed is:

1. In centrifugal control mechanism for an internal combustion engine or the like, including a rotating timing shaft, a rotating driving element, and means connecting said element with said shaft, the improvement which includes a yoke directly connected to said shaft and having spaced extending arms; centrifugal arms pivoted on said rotating element at spaced points, each said centrifugal arm having a cam section and said arms being so pivoted that the cam can engage a yoke arm to move said yoke and shaft relatively to said driving element; a loop extending around each said yoke arm and connected to said driving element at said pivot points; and a compression spring within each said loop and acting between said loop and said yoke arm.

2. In centrifugal control mechanism for an internal combustion engine or the like, including a rotating timing shaft having a shoulder, a rotating driving gear having a web and rim, and means connecting said gear with said shaft, the improvement which includes a yoke directly connected to said shaft shoulder and having a pair of oppositely disposed extending arms, said yoke also having a central circular flange to provide a space between said flange and shaft shoulder for reception of said gear web and wherein said gear is rotatable relative to said shaft; a pair of centrifugal arms pivoted on pins attached to said gear web at oppositely disposed points adjacent said yoke arms, each said centrifugal arm having a cam section adapted to engage a yoke arm to move said yoke and shaft relatively to the gear and the outer end of each said centrifugal arm extending around said yoke to the yoke arm opposite its pivot point and said outer end being rounded and said yoke arm being provided with an arcuate slot adapted to receive said rounded end and when so received locking said centrifugal arms and yoke in an inner position of the former, whereby said centrifugal arms are prevented from being moved outwardly by a back thrust from said shaft; a spring receiving loop for each yoke arm having sides extending on opposite sides of said yoke arm and provided with holes at the inner ends thereof through which said pin extends for attaching said loop to said gear web, the outer end of said loop connecting said sides being normally spaced from said yoke arm and having an inwardly extending, spring receiving projection; and a compression spring disposed between each said loop and the corresponding yoke arm, one end of said spring encircling said projection and said yoke arm having a well for reception of the opposite end of said spring, said springs being adapted to prevent outward movement of said centrifugal arms below a predetermined speed by resisting movement of said yoke arms.

3. In centrifugal control mechanism for an internal combustion engine or the like, including a rotating timing shaft, a rotating driving element, and means connecting said element with said shaft, the improvement which includes a yoke directly connected to said shaft and having a pair of oppositely disposed extending arms; a pair of centrifugal arms pivoted on said rotating element at oppositely disposed points, each said centrifugal arm being adapted to effect movement of a yoke arm to move said yoke and shaft relatively to the driving element; and means adapted to lock said centrifugal arms and yoke in an inner position of the former but permitting outward movement of said centrifugal arms by centrifugal force, whereby said centrifugal arms are prevented from being moved outwardly by a back thrust from said shaft, said last named means including the extension of each centrifugal arm around said yoke to the yoke arm opposite its pivot point with the outer end thereof being rounded and the yoke arm being provided with an arcuate slot adapted to receive said rounded end, and when so received, locking said centrifugal arms and yoke in an inner position of the former.

ALBERT ANDREWS.

References Cited in the file of this patent

UNITED STATES PATENTS

| Number | Name | Date |
|---|---|---|
| 2,225,383 | Andrews | Dec. 17, 1940 |
| 2,393,344 | Scott | Jan. 22, 1946 |

FOREIGN PATENTS

| Number | Country | Date |
|---|---|---|
| 425,922 | France | 1911 |
| 522,066 | France | 1921 |
| 452,210 | Great Britain | 1936 |
| 507,887 | Great Britain | 1939 |